(12) United States Patent
Simon et al.

(10) Patent No.: US 11,325,323 B2
(45) Date of Patent: May 10, 2022

(54) METHOD FOR PRODUCING AN ACOUSTICALLY RESISTIVE STRUCTURE, ACOUSTICALLY RESISTIVE STRUCTURE THUS OBTAINED, AND SOUND-ABSORPTION PANEL COMPRISING SAID ACOUSTICALLY RESISTIVE STRUCTURE

(71) Applicant: Airbus Operations S.A.S., Toulouse (FR)

(72) Inventors: Karl Simon, Le Landreau (FR); Florian Ravise, Saint-Herblain (FR); Denis Brossard, Saint Aignan de Grand Lieu (FR); Florian Chotard, Nantes (FR)

(73) Assignee: Airbus Operations S.A.S.

( * ) Notice: Subject to any disclaimer, the term of this patent is extended or adjusted under 35 U.S.C. 154(b) by 310 days.

(21) Appl. No.: 16/738,396

(22) Filed: Jan. 9, 2020

(65) Prior Publication Data
US 2020/0223158 A1 Jul. 16, 2020

(30) Foreign Application Priority Data
Jan. 15, 2019 (FR) ...................................... 19 00374

(51) Int. Cl.
*B29C 70/30* (2006.01)
*B29C 70/54* (2006.01)
(Continued)

(52) U.S. Cl.
CPC ............ *B29C 70/30* (2013.01); *B29C 70/545* (2013.01); *G10K 11/162* (2013.01);
(Continued)

(58) Field of Classification Search
None
See application file for complete search history.

(56) References Cited

U.S. PATENT DOCUMENTS

| 4,294,329 | A | 10/1981 | Rose et al. |
| 2002/0036115 | A1* | 3/2002 | Wilson .................... F02C 7/045 181/292 |

(Continued)

FOREIGN PATENT DOCUMENTS

| EP | 1355294 A1 | 10/2003 |
| FR | 2823590 A1 | 10/2002 |
| FR | 2908737 A1 | 5/2008 |

OTHER PUBLICATIONS

Search Report from French Application No. FR 1900374 dated Nov. 5, 2019, 2 pages.

*Primary Examiner* — Jeffry H Aftergut
(74) *Attorney, Agent, or Firm* — Lerner, David, Littenberg, Krumholz & Mentlik, LLP

(57) ABSTRACT

A method for producing an acoustically resistive structure includes the steps of creating, consolidating and cutting a first layer of reinforcing fibres embedded in a first thermoplastic resin having a first melting point so as to obtain an interlayer, a step of laying a second layer of reinforcing fibres against a first face of the interlayer, a second consolidation step of consolidating the second layer of reinforcing fibres embedded in a second thermoplastic resin having a second consolidation temperature lower than the first melting point of the first resin so as to obtain a non-perforated external layer bound to the interlayer, a step of perforating the external layer and a step of laying an internal layer on a second face of the interlayer. An acoustically resistive structure obtained from the method as well as a sound-absorption panel including such an acoustically resistive structure are also described.

9 Claims, 3 Drawing Sheets

(51) Int. Cl.
*G10K 11/162* (2006.01)
*B29K 71/00* (2006.01)
*B29K 79/00* (2006.01)
*B29L 31/30* (2006.01)

(52) U.S. Cl.
CPC .... *B29K 2071/00* (2013.01); *B29K 2079/085* (2013.01); *B29L 2031/3076* (2013.01)

(56) References Cited

U.S. PATENT DOCUMENTS

| | | | |
|---|---|---|---|
| 2002/0157764 A1* | 10/2002 | Andre | G10K 11/172 156/156 |
| 2004/0016595 A1 | 1/2004 | Andre et al. | |
| 2004/0148891 A1 | 8/2004 | Porte et al. | |
| 2010/0301161 A1 | 12/2010 | Chene et al. | |
| 2018/0016987 A1* | 1/2018 | Howarth | F02C 7/045 |

* cited by examiner

METHOD FOR PRODUCING AN ACOUSTICALLY RESISTIVE STRUCTURE, ACOUSTICALLY RESISTIVE STRUCTURE THUS OBTAINED, AND SOUND-ABSORPTION PANEL COMPRISING SAID ACOUSTICALLY RESISTIVE STRUCTURE

FIELD OF THE INVENTION

The present application relates to a method for producing an acoustically resistive structure, to an acoustically resistive structure thus obtained, and to a sound-absorption panel comprising said acoustically resistive structure.

BACKGROUND OF THE INVENTION

According to one known configuration visible in FIGS. 1 and 2, a sound-absorption panel 10 comprises an exterior surface 10.1, in contact with a medium M through which soundwaves travel, and an interior surface 10.2 opposite to the exterior surface 10.1. The sound-absorption panel 10 comprises, from the exterior surface 10.1 towards the interior surface 10.2, an acoustically resistive structure 12, a honeycomb structure 14 and a reflective layer 16. An acoustically resistive structure 12 comprises an perforated external layer 18 having an exterior face 18.1 which corresponds to the exterior surface 10.1 and an interior face 18.2, strips 20 of material fixed to the interior face 18.2 of the external layer 18, mutually spaced apart and oriented in a first direction, and filaments 22 attached to the strips 20 of material, mutually oriented in a second direction substantially perpendicular to the first direction. According to this configuration, the strips 20 of material delimit, between the external layer 18 and the filaments 22, acoustic cavities 24. For the acoustic performance to be optimal, the spacing between the strips 20 of material needs to be uniform and the edge faces 20.1, 20.2 of the strips 20 of material need to be flat and perpendicular to the external layer 18.

According to one configuration, the external layer 18 and the strips 20 of material are made from a composite material made up of carbon fibres embedded in a thermoplastic resin of the PEI (polyetherimide) type. According to one procedure, a first layer 26 of carbon fibres is laid on a laying surface in order to obtain the external layer 18, then the strips 20 of material are laid on the first layer 26. The first layer 26 and the strips 20 of material are covered with a consolidation bag and then consolidated in an autoclave. After this consolidation step, the edge faces 20.1, 20.2 of the strips 20 of material are curved and the opposite faces 20.3 of the strips 20 of material to the first layer 26 are not flat but domed, as illustrated in FIG. 2.

Next, the first layer 26 is perforated to obtain the perforated external layer 18. The filaments 24 are then fixed to the strips 20 of material so as to obtain the acoustically resistive structure 12.

This configuration is not entirely satisfactory because the edge faces 20.1, 20.2 of the strips 20 of material are curved and this disrupts the acoustic treatment. Furthermore, because the faces 20.3 of the strips 20 of material are domed, the surface areas for contact between the strips 20 of material and the filaments 22 are reduced, and this may detract from the mechanical strength of the bond between the strips 20 of material and the filaments 22.

BRIEF SUMMARY OF THE INVENTION

The present invention may overcome all or some of the disadvantages of the prior art.

An aspect of the invention is a method for producing an acoustically resistive structure comprising a perforated external layer, an internal layer and an interlayer positioned between the external and internal layers having a plurality of mutually-spaced strips of material, characterized in that the method comprises:
  a step of creating a first layer of reinforcing fibres,
  a first consolidation step of consolidating the first layer of reinforcing fibres embedded in a first thermoplastic resin having a first melting point,
  a step of cutting openings in the consolidated first layer so as to obtain the interlayer that exhibits an alternation of openings and of strips of material,
  a step of laying a second layer of reinforcing fibres against a first face of the interlayer,
  a second consolidation step of consolidating the second layer of reinforcing fibres embedded in a second thermoplastic resin having a second consolidation temperature lower than the first melting point of the first resin so as to obtain a non-perforated external layer bound to the interlayer,
  a step of perforating the external layer so as to obtain holes passing through the external layer in line with the openings of the interlayer,
  a step of laying the internal layer on a second face of the interlayer.

Cutting openings in an interlayer that is already consolidated makes it possible to obtain strips of material with flat edge faces and uniform spacings between the strips of material, and this contributes to optimizing the acoustic treatment. In addition, because the interlayer is already consolidated and rigid at the time of consolidation of the second layer, the faces of the strips of material against which the internal layer is positioned are substantially flat, making it possible to increase the surface area for contact between the strips of material and the internal layer, by comparison with the prior art.

According to one embodiment, the first resin is a resin of PEEK type and the second resin is a resin of PEI type.

According to another feature, at least one film of the second resin is applied, prior to the first consolidation step, to at least one of the first and second faces of the first layer on which the second layer will be laid.

According to one embodiment, first and second films of the second resin are applied to each of the first and second faces of the first layer before the first consolidation step.

According to another feature, several shells comprising the perforated external layer and the interlayer are assembled to obtain an approximately cylindrical rigid shell, and the step of laying the internal layer consists in winding at least one filament onto the strips of material of the interlayer.

According to one embodiment, each wound filament forming the internal layer is bound to the strips of material of the interlayer by activating the second film.

Another subject of the invention is an acoustically resistive structure obtained from the method according to the invention and a sound-absorption panel comprising such an acoustically resistive structure.

BRIEF DESCRIPTION OF THE DRAWINGS

Further features and advantages will become apparent from the following description of the invention, which description is given solely by way of example with reference to the attached drawings in which.

DETAILED DESCRIPTION

Figure 13:
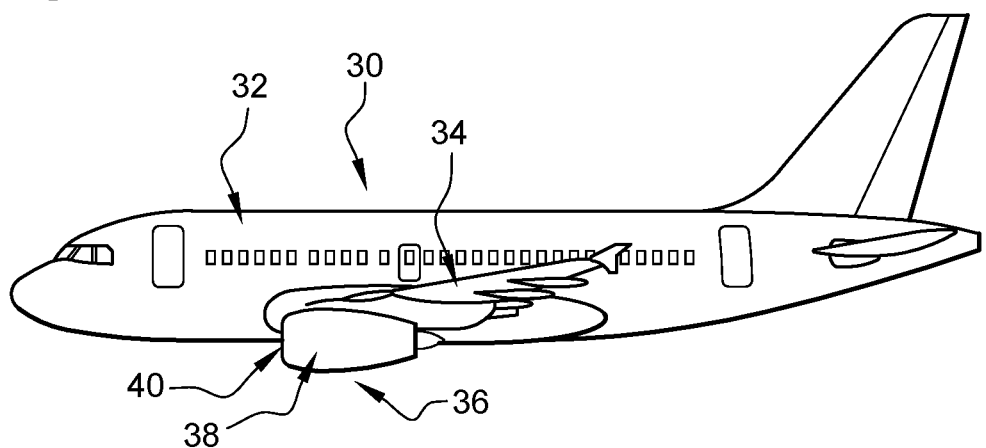
FIG. 13 is a lateral view of an aircraft.
Figure 14:
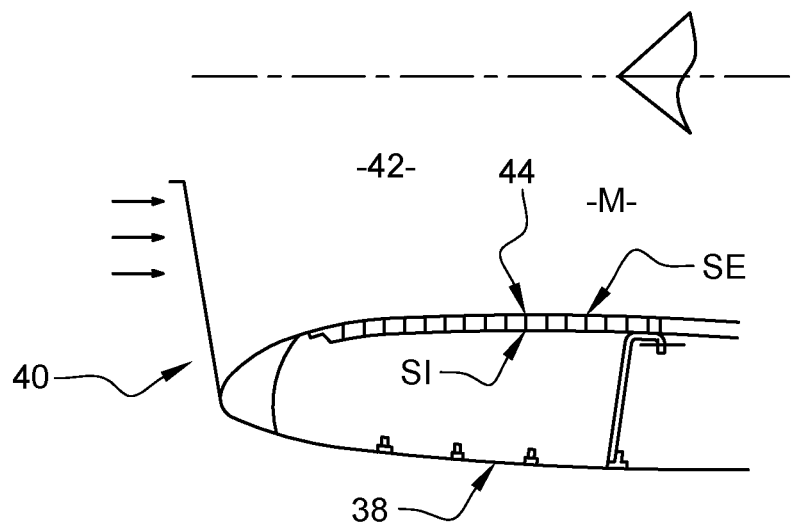
FIG. 14 is a section through a lower part of an air intake of a nacelle of the aircraft visible in FIG. 13.

FIG. 13 depicts an aircraft 30 which has a fuselage 32, two wings 34, positioned one on each side of the fuselage 32, and propulsion assemblies 36 fixed beneath the wings 34. Each propulsion assembly 36 comprises a nacelle 38 and a turbomachine positioned inside the nacelle 38. As illustrated in FIG. 14, the nacelle 38 comprises an air intake 40 which has a duct 42 for channeling a flow of air towards the turbomachine and a fan. This duct 42 is delimited by at least one sound absorption panel 44.

Figure 1:
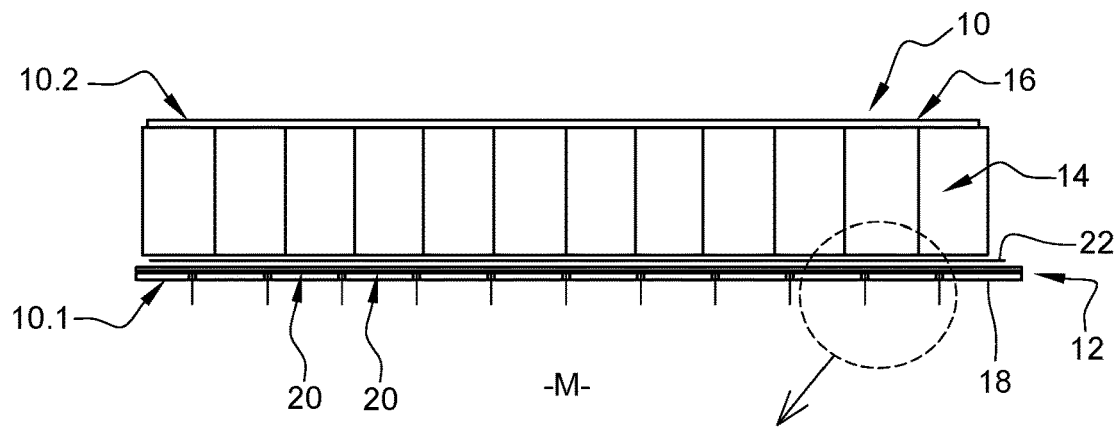
FIG. 1 is a section through a sound-absorption panel illustrating one configuration of the prior art.
Figure 2:
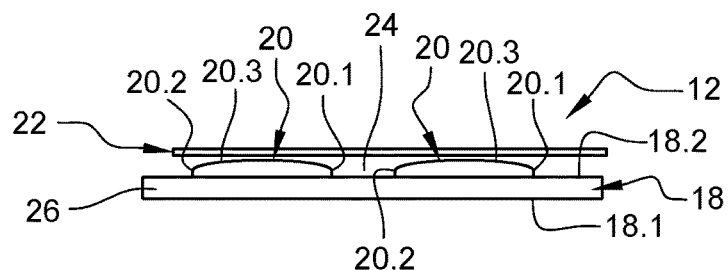
FIG. 2 is a section illustrating in detail the acoustically resistive structure of the sound-absorption panel visible in FIG. 1.
Figure 3:
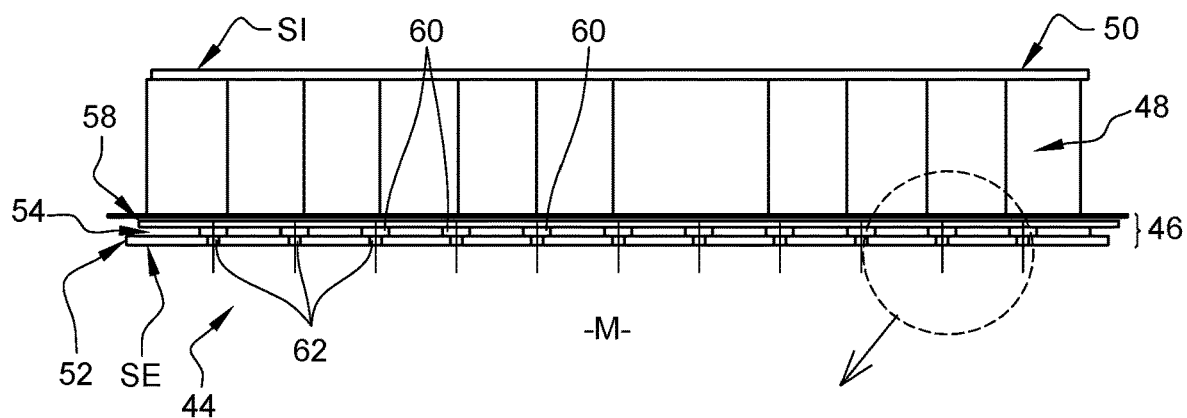
FIG. 3 is a section through a sound-absorption panel illustrating one embodiment of the invention.
Figure 4:
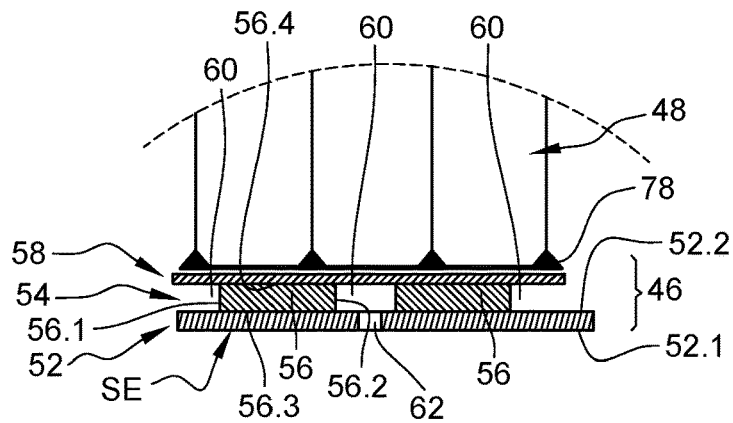
FIG. 4 is a section illustrating in detail the acoustically resistive structure of the sound-absorption panel visible in FIG. 3.

According to one embodiment visible in FIGS. 3 and 4, each sound-absorption panel 44 has an exterior surface SE, in contact with a medium M through which soundwaves travel, and an interior surface SI which is the opposite surface to the exterior surface SE. The sound absorption panel 44 comprises, from the exterior surface SE towards the interior surface SI, an acoustically resistive structure 46, a honeycomb structure 48 and a reflective layer 50. The honeycomb structure 48 and the reflective layer 50 are not described further because they may be identical to those of the prior art.

An acoustically resistive structure 46 comprises:

an external layer 52 having an exterior face 52.1 (which corresponds to the exterior surface SE) and an interior face 52.2, an interlayer 54, in contact with the interior face 52.2 of the external layer 52, having a plurality of strips 56 of material mutually spaced apart and oriented in a first direction, and an internal layer 58, in contact with the interlayer 54, having filaments (rovings of reinforcing fibres, tapes or strips of reinforcing fibres) solidly attached to the interlayer 54, mutually spaced apart and oriented in a second direction different from the first direction, substantially perpendicular to the first direction.

According to this configuration, the strips 56 of material of the interlayer 54 delimit, between the external layer 52 and the internal layer 58, acoustic cavities 60.

Each strip 56 of material of the interlayer 54 comprises first and second edge faces 56.1, 56.2 which extend between the internal and external layers 52, 58, an exterior surface 56.3 in contact with the external layer 52 and an interior surface 56.4 in contact with the internal layer 58.

The external layer 52 has through-holes 62, positioned at least in those zones of the external layer 52 that are situated in line with the acoustic cavities 60.

According to one embodiment, the interlayer 54 is obtained from reinforcing fibres embedded in a matrix of a first thermoplastic resin having a first melting point.

According to one embodiment, the reinforcing fibres are carbon fibres. The first resin is a resin of PEEK (polyetheretherketone) type which has a first melting point of the order of 342° C. and a first consolidation temperature of the order of 395° C.+/−5° C.

Figure 5:
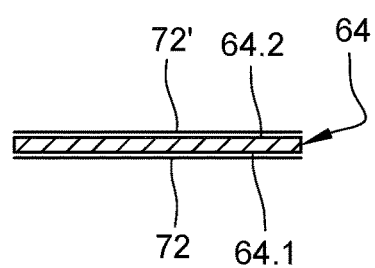
FIG. 5 is a section through a first layer forming an interlayer of an acoustically resistive structure before a first consolidation step, illustrating one embodiment of the invention.

According to one procedure visible in FIG. 5, in order to obtain the interlayer 54 during a step of creating a first layer 64, reinforcing fibres in the form of filaments, rovings, strips or tapes are laid on a laying surface which may be flat or curved according to the shape of the acoustically resistive structure desired.

After this creation step, the first layer 64 of reinforcing fibres is subjected to a first consolidation step at the first consolidation temperature in order to make it rigid. For this purpose, the first layer 64 of reinforcing fibres which is positioned on the laying surface is covered with a consolidation bag and subjected to a consolidation cycle (variation in temperature and in pressure). The reinforcing fibres may be preimpregnated with resin or the application of resin is performed concomitantly with the first consolidation step.

At the end of this first consolidation step, the first layer 64 is in the form of a rigid shell and comprises first and second faces 64.1, 64.2 oriented respectively towards the external layer 52 and towards the internal layer 58 once the various layers are assembled.

Figure 7:
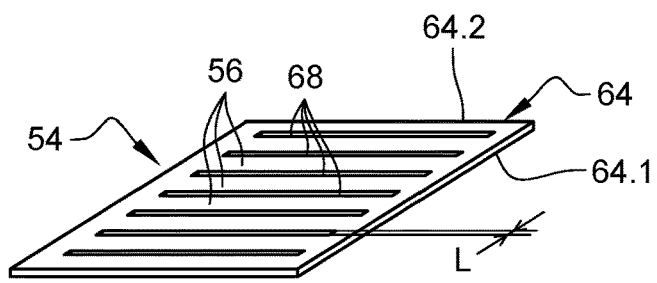
FIG. 7 is a perspective view of the interlayer after a step of producing openings, illustrating one embodiment of the invention.

During a cutting step, the consolidated first layer 64 is cut to form openings 68 passing through it in order to obtain the interlayer 54 that has an alternation of openings 68 and of strips 56 of material, as illustrated in FIG. 7. According to one procedure, the consolidated first layer 64 is cut using water jet cutting, laser cutting or any other means.

According to the invention, the first and second edge faces 56.1, 56.2 are substantially flat and perpendicular to the first and second faces 64.1, 64.2, which are substantially flat. In addition, the width L of each strip 56 of material is perfectly controlled, which means that the spacings between the strips 56 of material are uniform.

Figure 8:
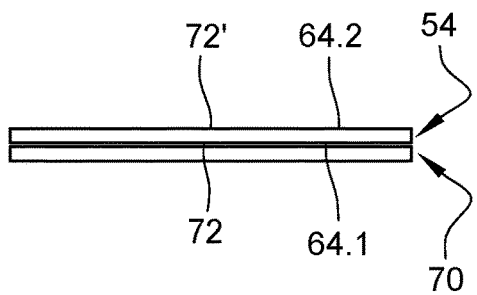
FIG. 8 is a section through an external layer and an interlayer of an acoustically resistive structure before a second consolidation step, illustrating one embodiment of the invention.

A second layer 70 of reinforcing fibres corresponding to the external layer 52 is pressed against the first face 64.1 of the interlayer 54, as illustrated in FIG. 8.

The second layer 70 can be obtained by the laying onto a second laying surface of filaments, rovings, tapes or strips of reinforcing fibres preimpregnated with the second resin.

This step of creating the second layer 70 may be accomplished in parallel with the steps of laying, consolidating and cutting the interlayer 54.

According to one embodiment, this second layer 70 comprises reinforcing fibres preimpregnated with a second thermoplastic resin having a second consolidation temperature lower than the first melting point. According to one embodiment, the second resin is a resin of PEI type which has a second melting point of the order of 210° C. and a second consolidation temperature of the order of 295° C.+/−5° C.

The interlayer 54 and the second layer 70 are subjected to a second consolidation step at the second consolidation temperature to make the second layer 70 rigid and bind the external layer 52 to the interlayer 54. To that end, the interlayer 54 and the second layer 70 are covered with a consolidation bag and subjected to a consolidation cycle (variation in temperature and in pressure). Like with the first layer 64, the reinforcing fibres of the second layer 70 may be preimpregnated with resin or the application of resin is performed concomitantly with the second consolidation step.

During this second consolidation step, the second resin of PEI type is miscible in the matrix of the PEEK-type first resin at the second consolidation temperature of the order of 295° C.+/−5° C. which is lower than the first melting point of the first resin. Because the interlayer 54 has already been made rigid, this second consolidation step does not deform the first and second edge faces 56.1, 56.2 and the exterior surface 56.4 of the strips 56 of material which remain perfectly flat.

Figure 9:
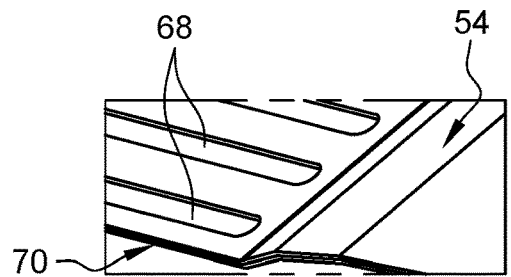
FIG. 9 is a perspective view of the external layer and interlayer which are visible in FIG. 8, after the second consolidation step.

At the end of this second consolidation step, what is obtained is a non-perforated external layer 52 and an interlayer 54 which are assembled, as illustrated in FIG. 9.

Figure 6:
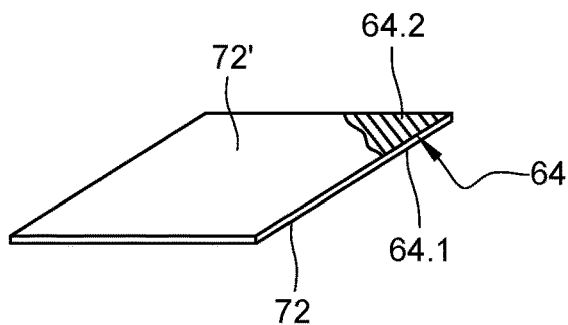
FIG. 6 is a perspective view of the first layer visible in FIG. 5, after the first consolidation step.

According to one embodiment visible in FIGS. 5 and 6, in order to encourage attachment between the external layer 52 and the interlayer 54 during the step of creating the first layer 64, at least one film 72 of the second resin is applied to at least one of the first and second faces 64.1, 64.2 of the first layer 64 on which the second layer 70 will be laid. Thus, at the end of the first consolidation step, the first face 64.1 of the first layer 64 on which the second layer 70 will be laid is covered with a film 72 of the second resin.

According to one procedure, first and second films 72, 72' of the second resin are applied to each of the first and second faces 64.1, 64.2 of the first layer 64 before the first consolidation step. Thus, at the end of the first consolidation step, the consolidated first layer 64 comprises a first film 72 of the second resin culminated onto its first face 64.1 and a second film 72' of the second resin culminated onto its second face 64.2. The second film 72' encourages adhesion between the interlayer 54 and the internal layer 58.

According to one embodiment, each film of resin 72, 72' has a thickness of the order of 25 μm. Each film of resin 72, 72' covers the entirety of the first or second face 64.1, 64.2 to which it is applied.

Figure 10:
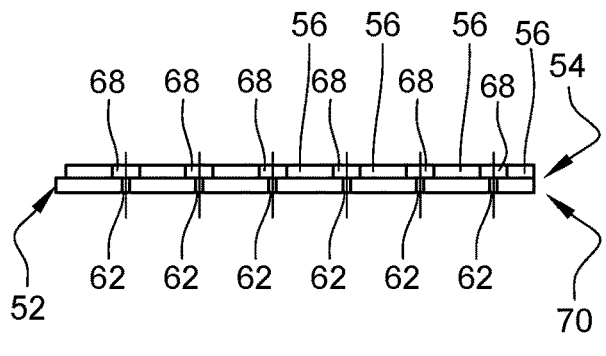
FIG. 10 is a section through the external layer and interlayer which are visible in FIG. 9 after a step of creating holes, illustrating one embodiment of the invention.
Figure 11:
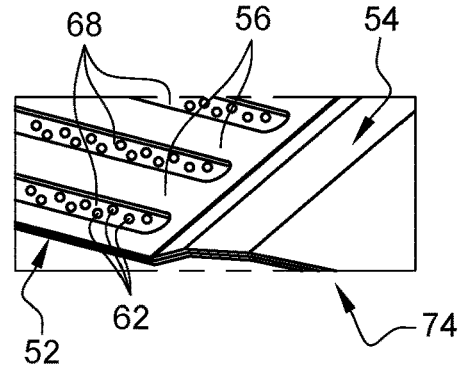
FIG. 11 is a perspective view of a shell comprising the external layer and interlayer which are visible in FIG. 10.
Figure 12:
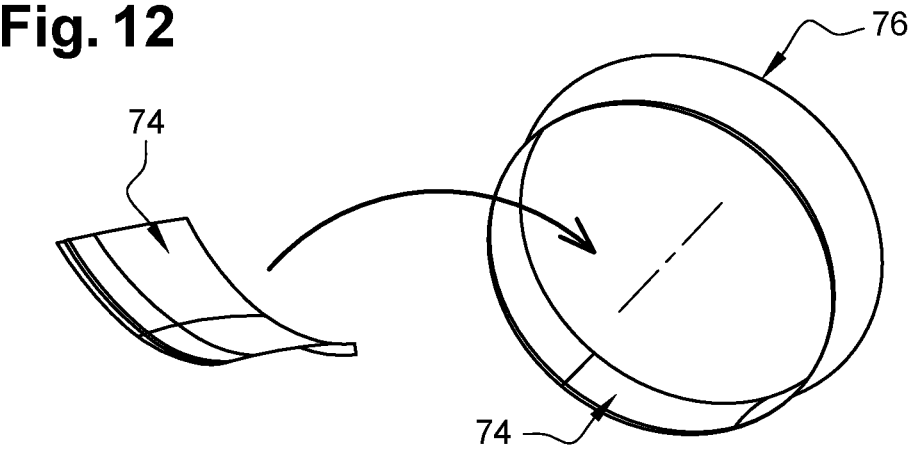
FIG. 12 is a perspective view of an assembly of shells, each one made up of a perforated external layer and of an interlayer with a step of laying an internal layer.

After the assembly of the external layer and the interlayer 52, 54, the holes 62 are made in the external layer 52 as illustrated in FIGS. 10 and 11. They may be created by any appropriate means. The strips 56 of material of the interlayer 54 can be used as a holing guide. The step of creating the holes 62 is not described further because it may be identical to that of the prior art.

At the end of this step of creating the holes 62, the perforated external layer 52 and the interlayer 54 form a rigid shell 74. Several of these shells 74 can be joined together to obtain an approximately cylindrical rigid shell 76 in order to form the duct 42.

At the end of this assembly step, the internal layer 58 is laid, by winding of at least one filament, onto the interior surface 56.4 of the strips 56 of material of the interlayer 54. The wound filament that forms the internal layer 58 is bound to the interlayer 54 by any suitable means, for example by activating the second film 72'.

After the internal layer 58 has been applied, an acoustically resistive structure 46 is obtained. Next, a honeycomb structure 48 equipped with a reflective layer 50 is connected to the acoustically resistive structure 46 by any suitable means, such as for example by using an adhesive film 78, so as to obtain an approximately cylindrical sound-absorption panel 44.

According to another embodiment, an internal layer 58 is pressed firmly against the interlayer 54 and connected thereto by any suitable means, so as to obtain an acoustically resistive structure 46 which can be connected to a honeycomb structure 48 equipped with a reflective layer 50 in order to form a sound-absorption panel 44.

Of course, the method for producing an acoustically resistive structure which has just been described is not limited to the sound-absorption panel present at an air intake duct 42. The sound-absorption panel thus formed can be used at other locations on an aircraft, or in other fields.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing an acoustically resistive structure comprising a perforated external layer, an internal layer and an interlayer positioned between the external and internal layers having a plurality of mutually-spaced strips of material, wherein the method comprises:
   creating a first layer of reinforcing fibres;
   consolidating, in a first consolidation step, the first layer of reinforcing fibres embedded in a first thermoplastic resin having a first melting point;
   cutting openings in the consolidated first layer so as to obtain an interlayer exhibiting an alternation of openings and of strips of material;
   laying a second layer of reinforcing fibres against a first face of the interlayer;
   consolidating, in a second consolidation step, the second layer of reinforcing fibres embedded in a second thermoplastic resin having a second consolidation temperature lower than the first melting point of the first resin so as to obtain a non-perforated external layer bound to the interlayer;
   perforating the external layer so as to obtain holes passing through the external layer in line with the openings of the interlayer; and
   laying the internal layer on a second face of the interlayer.

2. The method for producing an acoustically resistive structure according to claim 1, wherein the first resin is a resin of PEEK type.

3. The method for producing an acoustically resistive structure according to claim 1, wherein the second resin is a resin of PEI type.

4. The method for producing an acoustically resistive structure according to claim 1, wherein at least one film of the second resin is applied, prior to the first consolidation step, to at least one of the first and second faces of the first layer on which the second layer will be laid.

5. The method for producing an acoustically resistive structure according to claim 4, wherein the at least one film of the second resin comprises first and second films of the second resin applied to each of the first and second faces, respectively, of the first layer before the first consolidation step.

6. The method for producing an acoustically resistive structure according to claim 5, wherein several shells comprising the perforated external layer and the interlayer are assembled to obtain an approximately cylindrical rigid shell, and wherein the step of laying the internal layer includes winding at least one filament onto the strips of material of the interlayer.

7. The method for producing an acoustically resistive structure according to claim 5, wherein several shells comprising the perforated external layer and the interlayer are assembled to obtain an approximately cylindrical rigid shell, and wherein the step of laying the internal layer includes winding at least one filament onto the strips of material of the interlayer, and
wherein each wound filament forming the internal layer is bound to the strips of material of the interlayer by activating the second film.

8. An acoustically resistive structure obtained from the method according to claim 1.

9. A noise absorption panel comprising an acoustically resistive structure according to claim 8.

* * * * *